United States Patent Office 3,558,299
Patented Jan. 26, 1971

3,558,299
PROCESS FOR RENDERING PARTICULATE UREA SUBSTANTIALLY NONCAKING AND COMPOSITION
Herbert A. Baskin, 143 Holmes Ave., Covington, Tenn. 38019
No Drawing. Continuation-in-part of application Ser. No. 489,755, Sept. 23, 1965. This application Dec. 26, 1967, Ser. No. 693,151
Int. Cl. C05c 9/00
U.S. Cl. 71—28                                6 Claims

ABSTRACT OF THE DISCLOSURE

In abstract this invention is directed to a composition of matter consisting essentially of particulate urea coated with about 3–5% of a conditioner selected from the group consisting of finely divided clay, talc, mica, vermiculite, powdered nutshells, and pulverized corncobs blended with urease, the conditioner containing about 1000–2000 Sumner units per 100 grams of conditioner, the composition being substantially noncaking, all as recited hereinafter.

---

This is a continuation-in-part of my copending application Ser. No. 489,755, filed Sept. 23, 1965 and now abandoned.

Prior art methods for reducing the caking tendency of urea are taught by Canadian Pat. Nos. 648,545 and 648,549 and by U.S. Pats. Nos. 3,195,999 and 3,325,276.

In summary this invention is directed to a composition of matter consisting essentially of particulate urea having a surface coating of about 3–5% (preferably about 4–5%) by weight of a conditioner consisting essentially of a substantially inert substance selected from the group consisting of finely divided clay, talc, mica, vermiculite, powdered nutshells, and pulverized corncobs and a urease-containing material selected from the group consisting of powdered commercially available urease reagent, ground soybean hulls, soybean meal, jack bean meal, and watermelon seed meal, said conditioner containing about 1000–2000 Sumner units of urease per 100 grams, said composition being substantially noncaking.

In preferred embodiments:
(1) The inert substance is powdered clay;
(2) The urease-containing material is commercially available urease reagent;
(3) The urease-containing material is powdered jack bean meal; and
(4) The urease-containing material is soybean meal.

In another preferred embodiment (Embodiment A) this invention is directed to a process for rendering particulate urea substantially noncaking, said process comprising:
(a) Preparing a conditioner by mixing together a substantially inert material selected from the group consisting of finely divided clay, talc, mica, vermiculite, powdered nutshells, and pulverized corncobs used as a urease-containing material selected from the group consisting of powdered commercially available urease reagent, ground soybean hulls, soybean meal, jack bean meal, and watermelon seed meal in such ratio that the thus produced conditioner contains about 1000–2000 Sumner units of urease per 100 grams of conditioner;
(b) Coating said urea with the aforesaid conditioner by mixing said urea with about 3–5% by weight of said conditioner; and
(c) Recovering the thus prepared substantially noncaking coated urea.

In preferred embodiments of Embodiment A:
(1) The urea is coated with about 3% of said conditioner;
(2) The urea is coated with about 4% of said conditioner; and
(3) The conditioner consists essentially of finely divided clay and ground soybean meal.

It is an object of this invention to develop a substantially noncaking composition of matter consisting essentially of particulate urea, a substantially inert substance and a urease-containing material.

It is another object of this invention to develop a process for preparing substantially noncaking particulate urea.

Other objects will, as a result of the disclosure presented herein, be obvious to those skilled in the art.

Particulate urea is an article of economic importance. Its high nitrogen content makes it especially valuable as a plant food where it can be added to soil as urea per se or as a component of mixed fertilizers. Urea finds an important and large tonnage use as a feed supplement for ruminants. However, the fact that particulate urea cakes very easily and produces hard, untractable masses when caked, causes the user considerable trouble and expense. When spreading particulate urea on the soil as fertilizer free-flowing urea particles are essential. Otherwise a good distribution of the urea particles over the soil is impossible. In the case of feed mixing, lumps may damage the mixing apparatus, and, in any event, they prevent the automatic proportioning of the feed ingredients.

Particulate urea may appear in commerce as long, needlelike crystals or as rectangle or even square crystals of relatively large size. Particulate urea is also sold in the form of prills (substantially spherical or shot-like pellets or particles (ca. −6+10 mesh) and microprills (smaller prills, ca. −12+40 mesh). Usually particulate urea is dried to a low moisture content (ca. 0.2–0.4%), but even when the moisture content is reduced to such a low value, caking occurs. The caking tendency of urea prills, when they are properly dry-stored, is less pronounced than that of urea crystals or urea microprills. Nevertheless, urea prills cake even when stored in so-called moisture proof multi-walled bags or in plastic bags for periods of about 4–5 days or longer.

I have discovered that a substantially noncaking, particulate urea can be prepared by coating the particulate urea with a mixture of an inert substance and urease.

As inert substance, I prefer to use a finely divided claylike mineral selected from the group consisting of clay, talc, mica, vermiculite, and the like or a powdered organic substance such as nutshells or pulverized corncobs, or a mixture of two or more such substances. Clay is generally preferred for economic reasons. Powdered seed meal or other powdered urease-containing plant materials can be used instead of powdered commercially available urease reagent, usually at considerable cost advantage. If such plant materials are used, they are added to the inert substance in such proportions that the urease content of the resulting treating mixture (conditioner) is about equivalent to that obtained by adding about 3–5% of a commercially available urease reagent having a urease activity of about 350–400 Sumner units per gram to the inert substance. Such plant materials should be finely comminuted (e.g., ca. minus 50–60 mesh or finer). Larger amounts of urease or urease-containing plant material can be used, but are without any apparent advantage.

If a claylike mineral is used as inert substance, the mineral should be well dried, and finely divided (e.g., −100 mesh or finer). I have found that the usual commercially available clay such as Georgia kaolin, such as that sold for filling and loading uses, is particularly advantageous. Such clay, in the form of a dry free-flowing powder, is placed in a blending apparatus, e.g., in a Patterson-Kelly twin shell blender, a rotary drum blender, or the like. The urease-containing powder is added and the resulting mixture is blended (mixed) about 30 minutes.

About 95–97 parts of particulate urea (e.g., crystals, prills, or microprills) and about 3–5 parts of a conditioner, said conditioner being a blend of urease-containing material and a substantially dry inert substance, said blend containing about 1000–2000 Sumner units of urease per 100 grams, and not more than about 0.5–0.6% moisture are mixed in a blending apparatus, e.g., in a large Patterson-Kelly twin shell blender, a rotary drum blender, or the like. The total (urea plus conditioner) is always 100 parts—e.g., 95 parts urea plus 5 parts conditioner, 97 parts urea plus 3 parts conditioner, etc.

The blending operation should be continued until each particle of urea is well coated with the conditioner (treating mixture) and until very little free dust can be found in any small sampling of the urea (coated urea). The blending operation usually requires about one-half hour or less (depending on mixer speed).

The exact mechanism by which the process of the instant invention renders particulate urea substantially noncaking is not understood. It is known that urease under certain conditions destroys urea by converting (or hydrolyzing) said urea into carbon dioxide and ammonia. It is also known that the addition of urease or urease-containing plant materials such as ground, powdered, or pulverized soybean hulls, watermelon seeds, soybean meal, or jack bean meal to particulate urea substantially *increases* the caking tendency of particulate urea. It is also known that, under certain conditions, urease decomposes, hydrolyzes, or otherwise destroys urea. Thus, the process of the instant invention is completely unobvious to those skilled in the art. It also seems probable that any surface film of moisture which exists on the urea crystals will be absorbed by the conditioner, but no clearly evident chemical reaction has been detected in urea conditioned by the process of the instant invention. There is *no* evidence that, in process of this invention urea is destroyed, decomposed, or hydrolyzed by the conditioner. However, this treatment results in the production of coated particles of urea which are substantially noncaking under conditions which normally bring about caking of particulate urea with great rapidity. This is truly surprising because particulate urea coated with urease (but without clay or other inert substance of the type described supra) cakes to a greater extent than unconditioned urea.

The following are conventional tests which are used to measure the caking tendency of particulate urea:

(1) The Warehouse Stack Test: In this test, the particulate urea (or coated particulate urea) to be tested is packed in 100-lb. bags which are conventional commercial multi-wall bags, laminated with moisture barrier coatings based either on asphalt of polyethylene. Each bag is filled with the particulate urea to be tested to a 100-lb. net weight; then the bags are closed and arranged along the margins of a standard warehouse pallet, one bag along each side of the pallet. If there is an insufficient number of test bags to complete a layer on the pallet, additional bags of routine product are added as ballast. Six layers of bags are placed on the pallet.

The pallet of test material is then placed in warehouse storage, and weight is added by stacking two full pallets of commercially bagged product (6×4=24 bags/pallet) on top of said pallet of test material. The test pallet is stored in this condition for 28 days. At the end of the 28 days storage period, the test bags are carefully removed from the pallet and each is dropped once from a height of about 2 feet to separate any loosely held agglomeration of particles that may have formed during storage. Each bag is opened at one end, and its content is poured onto a 2 mesh screen which retains any lumps of caked material that may have formed during storage. The lumps are retrieved and weighed. The weight, in pounds, of cake retained on the 2 mesh screen is the measure of the caking tendency of the particulate urea being tested. The total recovered sample (caked and noncaked portions) is weighed.

(2) The Laboratory Caking Test: An effective laboratory test for determining the caking tendency of particulate urea is the so-called "Cylinder Test." A 100 gram sample of the particulate urea (or coated particulate urea) to be tested is placed in a metal cylinder having an internal diameter of 2 1/16 inches. The cylinder is fitted with a piston weighing 5.25 pounds (lbs.), which slides easily within the cylinder, and a weight of 20.5 lbs. is then placed on top of the piston, thereby to apply pressure to the urea in the cylinder. This pressure is applied for a period of 6 days. The cylinder is then carefully inverted and its bottom closure is removed. If the urea flows out of the cylinder as a heap of particles, the product is rated as noncaking. If, however, any aggregate lumps above 1 inch in diameter exist, they are weighed and the percent of caking tendency is calculated, based on the weight of the original sample. The total recovered sample (caked and noncaked portions) is weighed.

As stated supra, in addition to urease itself (e.g., commercially available urease) urease-bearing materials such as soybean meal, jack bean meal, ground soybean hulls, and the like are useful as urease sources in the process of the instant invention. These materials are used in such proportion that the urease content of conditioner prepared from such urease bearing materials and an inert substance (claylike materials, ground corncobs, powdered nutshells, and the like) reaches an effective value about equivalent to that obtained by adding 3–5% of a commercially available urease reagent having a urease activity of about 350–400 Sumner units per gram to enough inert substance to produce about 100 grams of conditioner. In other words, the urease activity, or content, of the conditioner (as applied to the urea) should be about 1,000–2,000 Sumner units per 100 grams of conditioner. Substantially dry comminuted (ca. minus about 50 to 60 mesh) materials excellently adapted for use in the process of this invention include such substances as ground soybean hulls, soybean meal, jack bean meal, and watermelon seed meal which have not been deactivated. Additionally, many seeds and plants contain urease and can be used in the treating mixture; however, they are not usually readily available in a substantially dry, comminuted condition.

When preparing urease-containing seeds for use in the process of my invention, care must be taken to avoid heating the seeds when drying or grinding them because the urease activity is diminished or destroyed by heating. For example, urease is deactivated by heating for only a few minutes (e.g., about 3–6 minutes) at about 100° C. and by slightly longer heating at somewhat lower temperature (e.g., about 8–20 minutes at 75–90° C.). Also, contact with heavy metal salts, e.g., salts of mercury, copper, or silver (especially contact with aqueous solution of such salts) deactivates urease.

As the examples which follow show, the caking tendency of particulate urea is very substantially reduced when the treating material (conditioner) which coats the particulate urea comprises but 3% of the total weight, said conditioner being a mixture of a substantially inert material of the type disclosed supra and a urease containing material of the type disclosed supra—said conditioner containing about 1000–2000 Sumner units of urease per 100 grams. At a urease content of about 1,000–2,000 Sumner units per 100 grams of conditioner and a weight of coating (conditioner) equalling 4% of the weight of the coated urea (i.e., urea plus conditioner) complete noncaking is assured. Higher proportions of urease and larger amounts of the urease-containing conditioner of the instant invention can be used with excellent results, but such modifications offer no advantages in reducing the caking tendency of urea.

I have obtained substantially identical results with urea prills, urea crystals, and urea microprills.

My invention is illustrated further by the following examples which are illustrative only and which are not intended to limit the scope of said invention.

EXAMPLE I

Urea prills, taken from a commercial lot, were placed in a drying cabinet and maintained therein until the moisture content of the prills was 0.34%. Subsequently, a portion of the dry urea prills was transferred to a dry Patterson-Kelly blender and a treating mixture (conditioner) previously prepared by blending 95% of a substantially dry clay suitable for use as a urea conditioner and 5% of a commercially available urease reagent having a urease activity of about 350–400 Sumner units per gram was added at the rate of about 4 parts of conditioner per 96 parts of urea (i.e., at a rate of 4%). The resulting mixture was blended about one-half hour. Following blending, a 100 gram sample, or portion, of the blended mixture was placed in the caking test apparatus which has been described above (The Laboratory Caking Test). The piston of the apparatus was loaded with a 20.5 lb. weight and the sample was maintained under a pressure of 7 p.s.i. and at room temperatures (e.g., ca. 20–30° C.) for 6 days. At the end of this period, the sample was removed from the cylinder, observed and weighed. Zero caking had occurred and the recovered sample weighed 100 grams, thereby showing that the urea had not been decomposed or destroyed by the conditioner.

EXAMPLE II

The general procedure of Example I was duplicated with the exception that the 4% of commercially available urease reagent having a urease activity of about 350–400 Sumner units per gram was present in the conditioner, or treating mixture. At the end of 6 days, during which the sample was maintained under the same conditions as in Example I, the sample was removed from the caking apparatus. It was found that no caking had occurred, and the sample of coated (conditioned) urea which weighed 100 grams when the caking test was started also weighed 100 grams when said test was finished.

EXAMPLE III

The general procedure of Example I was followed with the exception that the proportion of commercially available urease reagent having a urease activity of about 350–400 Sumner units per gram in the treating mixture, or conditioner, was 3%. After 6 days, during which the sample was maintained under the same conditions as in Example I, the sample was removed from the caking test apparatus. The proportion of caked material was less than 1%. The sample of coated (conditioned) urea submitted to the caking test weighed 100 grams when the test was started; said sample also weighed 100 grams when the test was finished.

EXAMPLE IV

A control was run by drying urea prills from the same lot that was used in Examples I–III to a moisture content of 0.34%. Subsequently a 100 gram portion of the thus dried, but unconditioned, urea was placed in the Laboratory Test apparatus described supra and maintained under pressure for 6 days at about 20–30° C. At the end of this period the sample was removed from the cylinder of the aforesaid apparatus. Fifty-eight grams of the material removed from said cylinder existed as lumps above about 1 inch in diameter. In other words, 58% of the urea had caked. The sample of urea submitted to the caking test weighed 100 grams when the test was started and 100 grams when the test was finished.

EXAMPLE V

The general procedure of Example IV was repeated, but in this instance the dried urea (0.34% moisture) was conditioned with about 4% of the same clay used in Examples I–III and no urease was used. Twenty-six grams of the material removed from the cylinder of the test apparatus existed as lumps above about 1 inch in diameter. In other words, 26% of the urea had caked.

EXAMPLE VI

The general procedure of Example I was repeated, but in this instance urea crystals analyzing about 0.25% moisture were used in place of the urea prills. After 6 days in the testing apparatus no caking had occurred. The sample of coated urea crystals used in this caking test weighed 100 grams when the test was started and 100 grams when the test was finished.

EXAMPLE VII

The general procedure of Example I was repeated, but in this instance urea crystals analyzing about 0.25% moisture and selected from the same lot as those used in Example VI were used. The crystals used in this example were *not* conditioned (i.e., were not coated with a conditioning agent). After 6 days in the testing apparatus, the crystals had set into a hard mass. In other words, 100% of the urea had caked. The urea sample used in this caking test weighed 100 grams when the test was started and 100 grams when the test was finished.

EXAMPLE VIII

The general procedure of Example V was repeated, but in this instance urea crystals analyzing about 0.25% moisture and selected from the same lot as those used in Example VI were used. After 6 days in the testing apparatus, seventy-three grams of the material removed from the apparatus had caked. In other words, 73% of the urea had caked. The coated urea sample used in this caking test weighed 100 grams when the test was started and 100 grams when the test was finished.

EXAMPLE IX

The general procedure of Example VI was repeated, but in this instance urea microprills were substituted for urea crystals. Said microprills analyzed about 0.3% moisture. The results obtained in this run were substantially identical with those obtained in Example VI.

EXAMPLE X

The general procedure of Example VII was repeated but in this instance urea microprills from the same lot used in Example IX (said microprills analyzing about 0.3% moisture) were substituted for urea crystals. The results obtained in this caking test were substantially identical with those obtained in Example VII—i.e., 100% of the urea caked and the test sample weighed 100 grams at the start of the test and at the end of the test.

EXAMPLE XI

A quantity of urea prills was treated in a drying chamber until the moisture content of said prills was 0.34%. The prills were then coated with 3% of a mixture of 95% kaolin clay suitable for conditioning urea and 5% commercially available urease having a urease activity of about 350–400 Sumner units per gram, which previously had been blended as above described. The treating mixture was blended with the prills in a Patterson-Kelly twin shell blender for about one-half hour. Four 100 lb. asphalt laminated multiwall bags were then loaded with the treated prills. The bags were arranged along the margins of a warehouse pallet, and the caking tendency of the thus treated urea was determined according to the Warehouse Stack Test described supra. Storage occurred in normal warehouse space which experienced normal room temperatures (e.g., ca. 20–30° C.) during the storage period. At the end of 28 days, each bag was removed from the pallet, dropped from a height of 2 feet onto a concrete floor, and then each bag was opened and its content poured onto a 2 mesh U.S. Standard screen. The contents of each bag passed through the screen. No lumps remained. The coated urea in each bag weighed 100 pounds when the Warehouse Stack Test was started and 100 pounds when said test was finished. The urea undergoing said test was not decomposed.

In Examples I–III, VI, IX, and XI, supra, a commercial grade of urease reagent obtained from the Fisher Scientific Company, said commercial having a urease activity of 350–400 Sumner units per gram was used. This commercial urease reagent was a fine power, ca. minus 100 mesh.

Sumner and Somers ("Chemistry and Methods of Enzymes," Academic Press Inc., New York, N.Y., 1953, page 158) state that a Sumner unit of urease is "that amount of urease which will form 1 mg. of ammonia nitrogen from urea-phosphate at pH 7.0 at 20° C. in five minutes.

EXAMPLE XII

The general procedure of Example XI was repeated with urea from the same lot that was used in Example XI, but in this instance the procedure was modified by omitting to add conditioner to the dried (0.34% moisture content) urea prills. At the end of the 28 day Warehouse Stack Test, 43% of the urea was retained on a 2 mesh U.S. Standard screen. In other words, 43% of the unconditioned urea had caked. The urea in each bag weighed 100 pounds when the test was started and 100 pounds when the test was finished. The urea was not decomposed or destroyed during the test.

EXAMPLE XIII

The general procedure of Example XI was repeated, using urea prills (0.34% moisture) content from the same lot that was used in Example XI, but in this instance the conditioner was 3% kaolin clay from the same lot used in Example IX without added urease. At the end of the 28 day test period, 32% of the urea was retained on a 2 mesh U.S. Standard screen. In other words, 32% of the urea had caked. The coated (conditioned) urea in each bag weighed 100 pounds when the Warehouse Stack Test was started and 100 pounds when the test was finished. The urea was not decomposed or destroyed during the test.

EXAMPLE XIV

A conditioner was prepared by blending a mixture of 90% by weight Georgia kaolin clay suitable for use as a urea conditioner and 10% by weight of freshly prepared soybean meal (ca. minus 80–100 mesh, said soybean meal having a urease activity of about 110–180 Sumner units per gram) in a Patterson-Kelly twin shell blender for about 30 minutes; the resulting mixture was labeled "Conditioner—HAB" and placed in a container which was then closed.

A quantity of urea prills (unconditioned urea prills) was selected from a lot (Lot No. A) having a moisture content of about 0.35% by weight; four portions of said urea prills were coated (conditioned) with varying quantities of the aforesaid "Conditioner—HAB" using the general procedure described in Example I, supra.

At substantially the same time four other portions of urea prills from said Lot No. A were coated (conditioned) with varying quantities of Georgia kaolin clay free of soybean meal, said clay being from the same lot that was used to prepare the aforesaid "Conditioner—HAB"; said clay was applied to said urea prills by the general method of said Example I.

The caking tendencies of the thus coated prills and the caking tendency of an uncoated (unconditioned) control sample of urea prills from said Lot A were determined by the general procedure of the Laboratory Caking Test described supra.

The following table (Table I) shows the results that were obtained:

TABLE I.—CAKING TENDENCY OF UREA PRILLS LABORATORY TEST. 100 GRAM SAMPLES [1]

| Percent by weight of conditioner added | Percent by weight of urea caked | | |
|---|---|---|---|
| | Control, no conditioner | Conditioned with conditioner—HAB | Conditioned with Georgia kaolin clay |
| 0, control | 67 | | |
| 1 | | 86 | 91 |
| 2 | | 68 | 76 |
| 3 | | 36 | 48 |
| 4 | | 0 | 21 |

[1] In each run reported in this table, a sample of urea (or coated (conditioned) urea) weighing 100 grams was submitted to the above-described Laboratory Caking Test, and in each run the sample of urea (or coated urea) weighed 100 grams when the test was completed; in other words, the urea was not decomposed, hydrolyzed, or otherwise destroyed during the run.

EXAMPLE XV

Eleven portions of urea prills taken from a lot ("Lot XV") of unconditioned (noncoated) urea prills analyzing about 0.35% moisture were conditioned (coated) with commercially available urease reagent having a urease activity of about 350–400 Sumner units per gram. The conditioner (said urease reagent without clay or other diluent being added thereto) was applied to said urea at rates to provide about 10, 20, 40, 60, 80, 100, 500, 1,000, 1,500, 2,000, and 2,500 Sumner units of urease per 100 g. of said urea.

The caking tendency of the thus treated urea prills and of a control sample of urea prills from Lot XV was determined by the Laboratory Caking Test described supra.

The following table (Table II) shows the results that were obtained:

TABLE II

Caking Tendency of Urea Prills
Laboratory Test, 100 Gram Samples [1]

(Urea prills conditioned with commercially available urease)

| Sumner units of urease per 100 grams of urea (control): | Percent by weight of urea caked |
|---|---|
| 0 | 72 |
| 10 | 92 |
| 20 | 92 |
| 40 | 92 |
| 60 | 93 |
| 80 | 94 |
| 100 | 96 |
| 500 | 100 |
| 1,000 | 100 |
| 1,500 | 100 |
| 2,000 | 100 |
| 2,500 | 100 |

[1] In each run reported in this table, a sample of urea (or coated (conditioned) urea) weighing 100 grams was submitted to the above described Laboratory Caking Test, and in each run the sample of urea (or coated urea) weighed 100 grams when the test was completed; in other words, the urea was not decomposed, hydrolyzed, or otherwise destroyed during the run.

Although quantities of the conditioner of my invention in excess of about 4–5% can be added to particulate urea without harming the urea, such excess quantities offer no advantage and decreases the nitrogen analysis of the thus coated urea.

The inert materials (e.g., claylike minerals, ground or pulverized corncobs, and pulverized or powdered nutshells) used in the process of this invention are substantially dry—i.e., they analyze less than about 1% and preferably less than about 0.5–0.6% moisture, and the coating compositions (inert material, or inert materials, plus a urease-containing material selected from the group consisting of powdered commercially available urease reagent, ground soybean hulls, soybean meal, jack bean meal and ground watermelon seeds) used in the process of this invention are substantially dry—i.e., they analyze less than about 1% and preferably less than about 0.5–0.6% moisture.

As used herein, less otherwise defined where used: (1) The term "percent" (%) means parts per hundred by weight; (2) The term "parts" means parts by weight; and (3) The terms "mesh" and "screen size" are expressed as U.S. standard.

In the Warehouse Stack Test a 100 lb. portion of urea (or coated urea) is used; hence, the weight in pounds of urea (or coated urea) maintained on a 2 mesh screen is a direct measure of the percent of urea (or coated urea) which caked during the test.

In the Laboratory Caking Test a 100 g. portion of urea (or coated urea) is used; hence, the weight in grams of lumps of urea (or coated urea) having a particle diameter above 1 inch is a direct measure of the percent of urea (or coated urea) which caked during the test.

I claim:

1. A composition of matter consisting essentially of particulate urea having a surface coating of about 3–5% by weight of a conditioner consisting essentially of an inert substance selected from the group consisting of finely divided clay, talc, mica, vermiculite, powdered nutshells, and pulverized corncobs and a urease-containing material selected from the group consisting of powdered commercially available urease reagent, ground soybean hulls, and watermelon seed meal, said conditioner containing about 1000–2000 Sumner units of urease per 100 grams of conditioner, said composition being substantially noncaking.

2. The composition of claim 1 in which the inert material is powdered clay.

3. The composition of claim 1 in which the urease-containing material is commercially available urease reagent.

4. A process for preparing substantially noncaking particulate urea comprising:

(a) preparing a conditioner by mixing together a substantially inert material selected from the group consisting of finely divided clay, talc, mica, vermiculite, powdered nutshells, and pulverized corncobs and a urease-containing material selected from the group consisting of powdered commercially available urease reagent, ground soybean hulls, soybean meal, jack bean meal in such ratio that the thus produced conditioner contains about 1000–2000 Sumner units of urease per 100 grams of conditioner;

(b) coating said urea with the aforesaid conditioner by mixing said urea with about 3–5% by weight of said conditioner; and (c) recovering the thus prepared substantially noncaking coated urea.

5. The process of claim 4 in which the urea is coated with 3% by weight of the conditioner.

6. The process of claim 4 in which the urea is coated with 4% by weight of the conditioner.

References Cited

UNITED STATES PATENTS

| 3,186,828 | 6/1965 | Baarson et al. | 71—65 |
| 3,249,441 | 5/1966 | Reynolds et al. | 71—28X |

OTHER REFERENCES

Hardesty et al.: "Factors Influencing the Efficiency of Fertilizer Conditioners," Agricultural Chemicals, February 1952, pp. 38, 38A–D, 39, 115, 117, 119.

J. L. DeCESARE, Primary Examiner

U.S. Cl. X.R.

71—64

PO-1050
(5/69)

UNITED STATES PATENT OFFICE
CERTIFICATE OF CORRECTION

Patent No. 3,558,299                Dated  January 26, 1971

Inventor(s) Herbert A. Baskin

It is certified that error appears in the above-identified patent and that said Letters Patent are hereby corrected as shown below:

The remainder of Claim 4 (a) beginning on Column 10, line 7 should read --reagent, ground soybean hulls, and watermelon seed meal in such ratio that the thus produced conditioner contains about 1000-2000 Sumner units of urease per 100 grams of conditioner;--

Signed and sealed this 11th day of May 1971.

(SEAL)
Attest:

EDWARD M. FLETCHER, JR.          WILLIAM E. SCHUYLER,
Attesting Officer                Commissioner of Pate